(12) United States Patent
Chang et al.

(10) Patent No.: US 9,110,448 B2
(45) Date of Patent: Aug. 18, 2015

(54) SYSTEM AND METHOD FOR PROCESSING A POINT CLOUD USING A COMPUTING DEVICE

(75) Inventors: Chih-Kuang Chang, New Taipei (TW); Zhong-Kui Yuan, Shenzhen (CN); Li Jiang, Shenzhen (CN); Zhi-Jun Zou, Shenzhen (CN); Xiao-Guang Xue, Shenzhen (CN)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 533 days.

(21) Appl. No.: 13/553,799

(22) Filed: Jul. 19, 2012

(65) Prior Publication Data

US 2013/0173216 A1    Jul. 4, 2013

(30) Foreign Application Priority Data

Dec. 29, 2011    (CN) .............................. 201110453770

(51) Int. Cl.
| G06F 17/18 | (2006.01) |
| G05B 1/00 | (2006.01) |
| G06T 15/00 | (2011.01) |
| G06T 1/00 | (2006.01) |
| G06T 17/20 | (2006.01) |

(52) U.S. Cl.
CPC ................ *G05B 1/00* (2013.01); *G06T 1/0007* (2013.01); *G06T 15/00* (2013.01); *G06T 17/20* (2013.01); *G06T 17/205* (2013.01); *G06T 2207/30164* (2013.01)

(58) Field of Classification Search
CPC  G05B 1/00; G06T 2207/30164; G06T 15/00; G06T 1/0007; G06T 17/205; G06T 17/20
USPC ............ 702/83, 167, 179; 382/110, 154, 162, 382/312; 33/503, 554; 345/419, 420; 452/157, 198
See application file for complete search history.

(56) References Cited

U.S. PATENT DOCUMENTS

| 4,567,347 | A * | 1/1986 | Ito et al. .................... 219/124.34 |
| 5,465,221 | A * | 11/1995 | Merat et al. ...................... 702/83 |
| 6,580,425 | B1 * | 6/2003 | Zwicker et al. ................ 345/420 |
| 6,738,727 | B2 * | 5/2004 | Chang ............................ 702/167 |
| 7,065,461 | B2 * | 6/2006 | Chang et al. ..................... 702/81 |
| 7,190,826 | B2 * | 3/2007 | Russell et al. ................. 382/154 |
| 7,313,264 | B2 * | 12/2007 | Crampton ..................... 382/154 |
| 7,406,395 | B2 * | 7/2008 | Wu et al. ........................ 702/167 |
| 7,596,468 | B2 * | 9/2009 | Chang et al. ................... 702/167 |
| 7,746,341 | B2 * | 6/2010 | Chang et al. ................... 345/420 |

(Continued)

*Primary Examiner* — Carol S Tsai
(74) *Attorney, Agent, or Firm* — Novak Druce Connolly Bove + Quigg LLP

(57) ABSTRACT

In a method for processing a point cloud using a computing device, a straight line fitted by the point cloud comprising border points is determined as a benchmark line. An inflection point in the point cloud of the benchmark line is determined. If the vertical distance of the inflection point is not greater than the preset filtration value, needless border points in the point cloud are deleted and a remainder point cloud is obtained. If the vertical distance between the inflection point and the benchmark line is greater than a filtration value, the point cloud is divided into two sub-point clouds, and the one sub-point cloud having border points less than the preset number is deleted, and the other sub-point cloud is set as a remainder point cloud.

18 Claims, 4 Drawing Sheets

(56) References Cited

U.S. PATENT DOCUMENTS

| | | | |
|---|---|---|---|
| 7,830,374 B2 * | 11/2010 | Chang et al. | 345/419 |
| 8,112,172 B2 * | 2/2012 | Chen et al. | 700/175 |
| 2009/0112511 A1 * | 4/2009 | Chang et al. | 702/167 |
| 2010/0053191 A1 * | 3/2010 | Chang et al. | 345/589 |

* cited by examiner

SYSTEM AND METHOD FOR PROCESSING A POINT CLOUD USING A COMPUTING DEVICE

BACKGROUND

1. Technical Field

Embodiments of the present disclosure relate to point clouds processing, and more particularly to a system and method for processing a point cloud using a computing device.

2. Description of Related Art

During measurement of a border of a workpiece using a measurement program, a line detection tool may be used to detect a point cloud including border points of the workpiece within a designated area, and fit the point cloud to be a straight line. However, because the border of the workpiece may include a burry, a turning or a convex region, the line detection tool may detect some useless miscellaneous points included in the point cloud. The line detection tool cannot filter the useless miscellaneous points intelligently, and may fit an inappropriate line different from a desired line according to user requirements. Then, a measurement result of the workpiece may be inaccurate.

DETAILED DESCRIPTION

Figure 1:
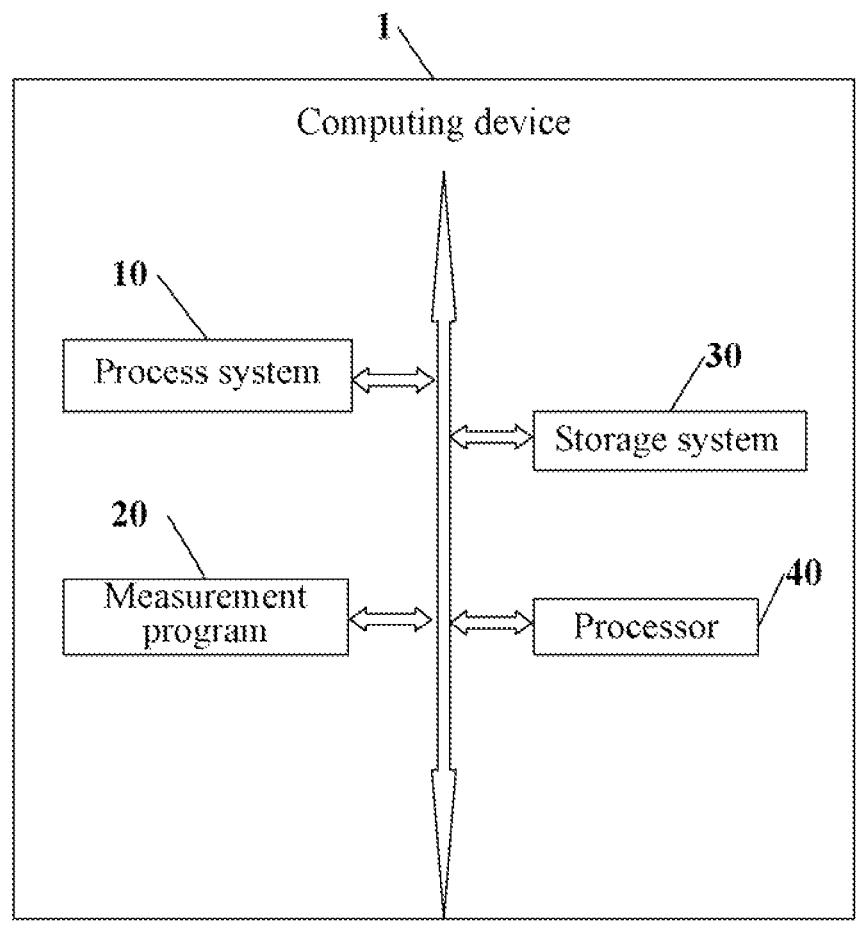
FIG. 1 is a block diagram of one embodiment of a computing device including a process system.

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one."

In general, the word "module" as used herein refers to logic embodied in hardware or firmware, or to a collection of software instructions, written in a programming language, such as, Java, C, or assembly. One or more software instructions in the modules may be embedded in firmware, such as in an erasable-programmable read-only memory (EPROM). The modules described herein may be implemented as either software and/or hardware modules and may be stored in any type of non-transitory computer-readable medium or other storage device. Some non-limiting examples of non-transitory computer-readable media include compact discs (CDs), digital versatile discs (DVDs), Blu-ray disks, flash memory, and hard disk drives.

FIG. 1 is a block diagram of one embodiment of a computing device 1 including a process system 10. The computing device 1 further includes a measurement program 20, a storage system 30 and at least one processor 40. The measurement program 20 may process point cloud data of a workpiece, such as, fitting discrete points to establish a feature element of a line, a plane, a circle, a cylinder or a sphere. The measurement program 20 further includes a line detection tool (not shown in FIG. 1). The line detection tool may detect a point cloud including a plurality of border points of the workpiece in a designated area, and fit the detected point cloud to be a specified feature element, such as a straight line. In one embodiment, the tool uses a least square method to fit the straight line. The process system 10 may filter undesirable border points (e.g., a burry, a turning or a convex of the workpiece) from the point cloud of the workpiece, and refit remainder border points to an accurate straight line.

The at least one processor 40 executes one or more computerized codes and other applications of the computing device 1, to provide functions of the process system 10. The storage system 30 stores data of the electronic device 1, such as, point cloud data of the workpiece. The storage system 30 may be a memory (e.g., random access memory, flash memory, hard disk drive) of the computing device 1.

Figure 2:
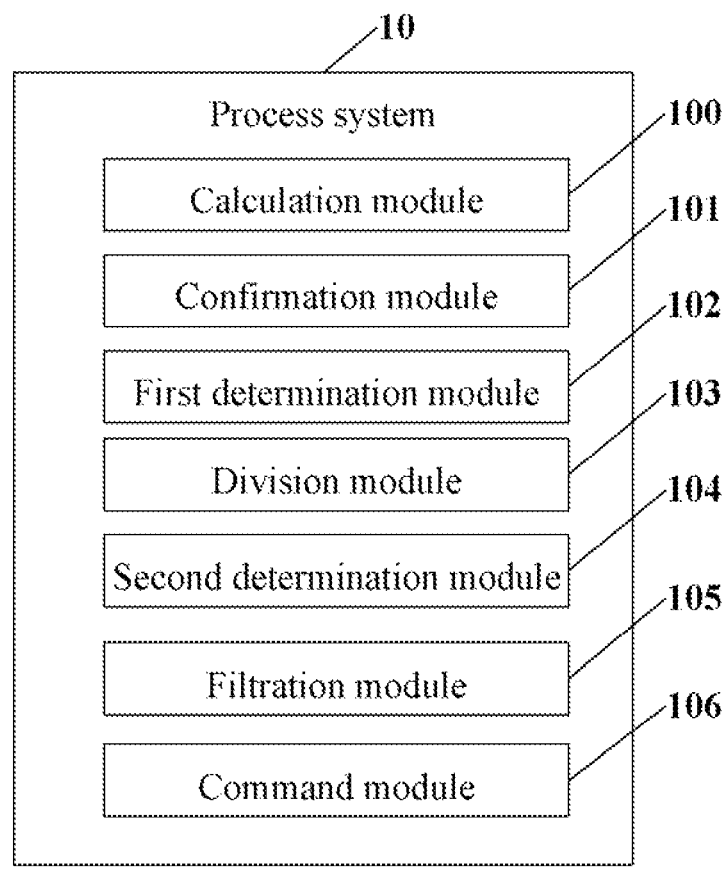
FIG. 2 is a block diagram of function modules of a process system included in the computing device of FIG. 1.

FIG. 2 is a block diagram of function modules of the process system 10 included in the computing device of FIG. 1. In the embodiment, the process system 10 may include a calculation module 100, a confirmation module 101, a first determination module 102, a division module 103, a second determination module 104, a filtration module 105, and a command module 106. The modules 100-106 comprise computerized codes in the window of one or more programs that are stored in the storage system 30. The computerized codes include instructions that are executed by the at least one processor 40 to provide functions for the modules. Details of each of the modules will be given in FIG. 3 and FIG. 4.

Figure 3:
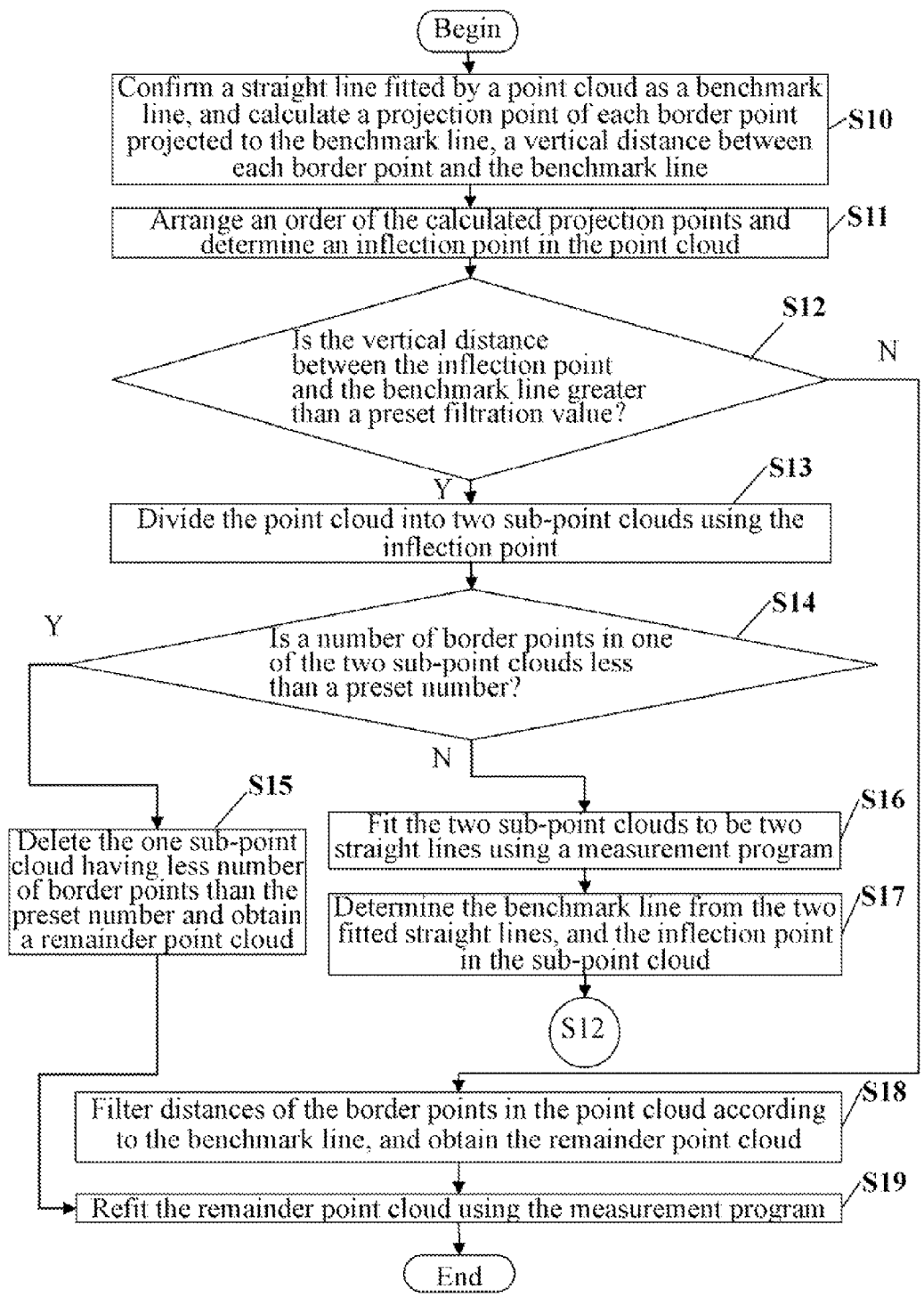
FIG. 3 is a flowchart of one embodiment of a method for processing a point cloud using the computing device of FIG. 1.

FIG. 3 is a flowchart of one embodiment of a method for managing machining files using the computing device of FIG. 1. Depending on the embodiment, additional steps may be added, others deleted, and the ordering of the steps may be changed.

In step S10, when the measurement program 20 fits a point cloud including border points to be a straight line, the calculation module 100 determines the straight line as a benchmark line. The calculation module 100 further calculates a projection point of each of the border points projected to the benchmark line, and calculates a vertical distance between each of the border points and the benchmark line. In one embodiment, because the border points in the point cloud may be located at both sides surrounding the benchmark line, a value of each vertical distance may be positive or negative. A unit of each vertical distance may be represented by a pixel. In one embodiment, a start point and an end point of the point cloud may be located at a same side of the determined benchmark line.

In step S11, the confirmation module 102 arranges an order of the calculated projection points of the border points, and determines an inflection point in the point cloud that is used to fit the determined benchmark line. In one embodiment, the confirmation module 101 selects a point on the determined benchmark line as a benchmark point, calculates a vertical distance between each of the calculated projection points and the benchmark point, and arranges the calculated projection points in a predetermined order according a size of each calculated distance.

In some embodiments, the inflection point may conform to three conditions as follows. The first condition is that the inflection point is not the start point and the end point of the border points, that is, the distance between the projection point of the inflection point and the determined benchmark line is not the maximum and the minimum. The second condition is that the start point and inflection point are located at different sides of the determined benchmark line. That is, if the vertical distance between the start point and the determined benchmark line is positive, the vertical distance between the inflection point and the determined benchmark line is negative, and if the vertical distance between the start point and the determined benchmark line is negative, the vertical distance between the inflection point and the determined benchmark line is positive. The third condition is that the inflection point has the maximum vertical distance between the inflection point and the determined benchmark line among the border points located at a same side with the inflection point of the determined benchmark line. The purpose of determining the inflection point is to confirm an approximate orientation of the straight line fitted by the point cloud.

Figure 4A:
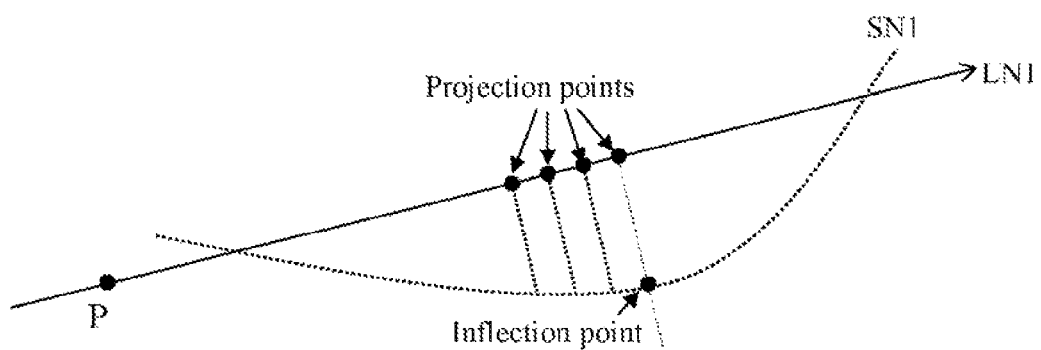
FIG. 4A and FIG. 4B are schematic diagrams of one embodiment of a method of determining an inflection point in the point cloud.

As shown in FIG. 4, the point cloud including the border points is marked with "SN1", and the point cloud "SN1" can be fitted to the straight line marked with "LN1". Projection points corresponding to partial border points of "SN1" projected to the "LN1" are shown in FIG. 4A. If a point marked with "P" on the "LN1" is the benchmark point, the confirmation module 101 determines the inflection point of the "SN1" according the above three conditions of the inflection point. The inflection point has been clearly pointed out by an arrow shown in FIG. 4A In step S12, the first determination module 102 determines whether the vertical distance between the determined inflection point and the determined benchmark line is greater than a preset filtration value. The preset filtration value may be 10 pixels. If the vertical distance between the determined inflection point and the determined benchmark line is greater than the preset filtration value, step S13 is implemented. If the vertical distance between the determined inflection point and the determined benchmark line is less than or equal to the preset filtration value, step S18 is implemented.

In step S13, the division module 103 divides the point cloud into two sub-point clouds using the determined inflection point, such as, the first sub-point cloud and the second sub-point cloud.

In step S14, the second determination module 104 determines whether a number of border points in one of the two sub-point clouds is less than a preset number (e.g. 2). If the number of the border points in one sub-point cloud is less than the preset number, step S15 is implemented. If the numbers of the border points in the two sub-point cloud are both greater than or equal to the preset number, block S16 is implemented. In one embodiment, at least one of the number of the border points in the two sub-point cloud is greater than the preset number, that is, the numbers of the two sub-point cloud cannot not be less than the preset number simultaneously.

In step S15, the filtration module 105 deletes the one sub-point cloud (e.g. the first the sub-point cloud) having the number of the border points less than the preset number. In addition, the filtration module 105 further sets the other sub-point cloud (e.g. the second the sub-point cloud) having the number of the border points greater than or equal to the preset number as a remainder point cloud, and step S19 is implemented.

In step S16, the command module 106 fits the two sub-point clouds to be two straight lines using the line detection tool of the measurement program 20.

In step S17, the confirmation module 101 determines one of the two fitted straight lines as the benchmark line, and determines the inflection point in the sub-point cloud that is used to fit the determined benchmark line, and the procedure returns to step S12 according to the determined benchmark line and determined inflection point in step S17.

In one embodiment, the confirmation module 101 determines the benchmark line from the two fitted straight lines by following steps: calculating a first vertical distance and a second vertical distance between each of the border points in both of the two sub-point clouds and the two fitted straight lines; determining two maximum vertical distances to the two fitted straight lines correspondingly from the calculated first vertical distances and the second vertical distances; selecting a smaller one of the two maximum vertical distances, and determining the straight line corresponding to the selected maximum vertical distance as the benchmark line. The method of determining the inflection point in the sub-point cloud is the same as the method of determining the inflection point in the point cloud according to step S10 and step S11.

Figure 4B:
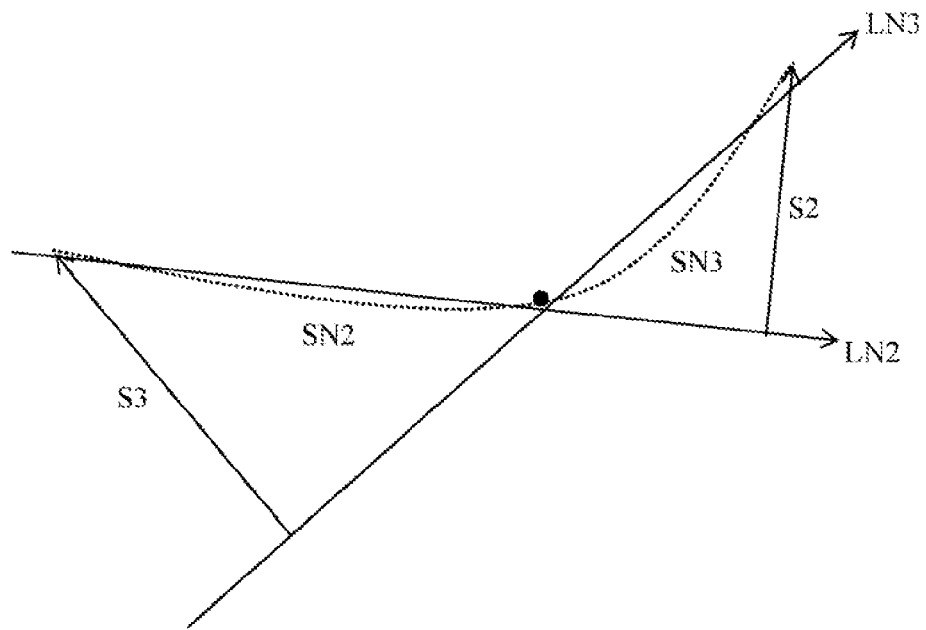

As shown in FIG. 4B, if the vertical distance between the determined inflection point and the determined benchmark line is greater than the preset filtration value in step S12, the division module 103 divides the point cloud "SN1" into the first sub-point cloud "SN2" and the second sub-point cloud "SN2" through the determined inflection point. The first sub-point cloud "SN2" is fitted to a first line "LN2" and the second sub-point cloud "SN3" is fitted to a second line "LN3" using the measurement program 20. The confirmation module 101 calculates a vertical distance "S2" to be the first maximum vertical distance in the vertical distances between the point cloud "SN1" and the first line "LN2", and calculates a vertical distance "S3" to be the second maximum vertical distance in the vertical distances between the point cloud "SN1" and the first line "LN3". If the first maximum vertical distance "S2" is larger than the second maximum vertical distance "S3", the second line "LN3" corresponding to the second maximum vertical distance "S3" is determined to be the benchmark line. If the second maximum vertical distance "S3" is larger than the first maximum vertical distance "S2", the first line "LN2" corresponding to the first maximum vertical distance "S2" is determined to be the benchmark line.

In step S18, the filtration module 105 deletes needless border points in the point cloud according to a predetermined distance value (e.g. 1 pixel) and the determined benchmark line, and obtains the remainder point cloud that does not include the needless border points in the point cloud. In one embodiment, if a distance between a border point and the determined benchmark line is larger than a predetermined distance value (e.g. 1 pixel), the filtration module 105 determines that the border point is a needless border point, and deletes the needless border point from the point cloud. In one embodiment, the determined benchmark line can be the benchmark line determined according to the point cloud in step S10, and also can be the benchmark line determined according to the sub-point cloud in step S17.

In step S19, the command module 106 refits the remainder point cloud using the measurement program 20. The border points in the remainder point cloud has filtered out useless miscellaneous points, and can be fitted a more accurate line in accordance with user requirements. The refitted remainder point cloud can be from the remainder point cloud in step S15, and also can be from the remainder point cloud in step S18.

All of the processes described above may be embodied in, and be fully automated via, functional code modules executed by one or more general-purpose processors. The code modules may be stored in any type of non-transitory readable medium or other storage device. Some or all of the methods may alternatively be embodied in specialized hardware. Depending on the embodiment, the non-transitory readable medium may be a hard disk drive, a compact disc, a digital video disc, a tape drive or other suitable storage medium.

The described embodiments are merely possible examples of implementations, and have been set forth for a clear understanding of the principles of the present disclosure. Many variations and modifications may be made without departing substantially from the spirit and principles of the present disclosure. All such modifications and variations are intended to be included herein within the scope of this disclosure and the described inventive embodiments, and the present disclosure is protected by the following claims.

What is claimed is:

1. A computer-implemented method for processing a point cloud using a computing device, the method comprising:
   determining a straight line fitted by the point cloud as a benchmark line, the point cloud comprising border points of a workpiece;
   determining an inflection point in the point cloud that is used to fit the determined benchmark line;
   determining whether a vertical distance between the determined inflection point and the determined benchmark line is greater than a preset filtration value;
   deleting needless border points in the point cloud, and obtaining a remainder point cloud that does not include the needless border points in the point cloud, if the vertical distance between the determined inflection point and the determined benchmark line is less than or equal to the preset filtration value, a distance between the needless border point and the determined benchmark line being greater than a predetermined distance value; or
   dividing the point cloud into two sub-point clouds using the determined inflection point, if the vertical distance between the determined inflection point and the determined benchmark line is greater than the preset filtration value; and
   deleting one sub-point cloud having a number of the border points less than a preset number, and setting the other sub-point cloud having the number of the border points greater than or equal to the preset number as a remainder point cloud.

2. The method according to claim 1, further comprising:
   fitting the two sub-point clouds to be two straight lines using a measurement program in the computing device, if numbers of the border points in the two sub-point cloud are both greater than or equal to the preset number;
   determining one of the two fitted straight lines as the benchmark line, determining the inflection point in the sub-point cloud that is used to fit the determined benchmark line, and returning to the step of determining whether the vertical distance between the determined inflection point and the determined benchmark line is greater than the preset filtration value.

3. The method according to claim 1, wherein the method further comprises steps before a step of determining the inflection point in the point cloud:
   calculating a projection point of each of the border points projected to the benchmark line, and calculating a vertical distance between each of the border points and the determined benchmark line;
   selecting a point on the determined benchmark line as a benchmark point;
   calculating a vertical distance between each of the calculated projection points and the benchmark point, a value of the vertical distance between each of the calculated projection points and the benchmark point being positive or negative; and
   arranging the calculated projection points in an order according a size of each calculated distance.

4. The method according to claim 3, wherein the inflection point conforms according to that:
   the distance between the projection point of the inflection point and the determined benchmark line is not the maximum and the minimum;
   if the vertical distance between a start point of the point cloud and the determined benchmark line is positive, the vertical distance between the inflection point and the determined benchmark line is negative, or if the vertical distance between the start point and the determined benchmark line is negative, the vertical distance between the inflection point and the determined benchmark line is positive; and
   the inflection point has the maximum vertical distance between the inflection point and the determined benchmark line among the border points located at a same side with the inflection point of the determined benchmark line.

5. The method according to claim 2, wherein the benchmark line is determined from the two fitted straight lines by:
   calculating a first vertical distance and a second vertical distance between each of the border points in both of the two sub-point clouds and the two fitted straight lines;
   determining two maximum vertical distances to the two fitted straight lines correspondingly from the calculated first vertical distances and the second vertical distances;
   selecting a smaller one of the two maximum vertical distances, and determining the straight line corresponding to the selected maximum vertical distance as the benchmark line.

6. The method according to claim 1, further comprising:
   refitting the remainder point cloud using the measurement program.

7. A non-transitory storage medium storing a set of instructions, when executed by at least one processor of a computing device, cause the at least one processor to perform a method for processing a point cloud using the computing device, the method comprising:
   determining a straight line fitted by the point cloud as a benchmark line, the point cloud comprising border points of a workpiece;
   determining an inflection point in the point cloud that is used to fit the determined benchmark line;
   determining whether a vertical distance between the determined inflection point and the determined benchmark line is greater than a preset filtration value;
   deleting needless border points in the point cloud, and obtaining a remainder point cloud that does not include the needless border points in the point cloud, if the vertical distance between the determined inflection point and the determined benchmark line is less than or equal to the preset filtration value, a distance between the needless border point and the determined benchmark line being greater than a predetermined distance value; or
   dividing the point cloud into two sub-point clouds using the determined inflection point, if the vertical distance between the determined inflection point and the determined benchmark line is greater than the preset filtration value; and
   deleting one sub-point cloud having a number of the border points less than a preset number, and setting the other sub-point cloud having the number of the border points greater than or equal to the preset number as a remainder point cloud.

8. The non-transitory storage medium according to claim 7, further comprising:
   fitting the two sub-point clouds to be two straight lines using a measurement program in the computing device, if numbers of the border points in the two sub-point cloud are both greater than or equal to the preset number;

determining one of the two fitted straight lines as the benchmark line, determining the inflection point in the sub-point cloud that is used to fit the determined benchmark line, and returning to the step of determining whether the vertical distance between the determined inflection point and the determined benchmark line is greater than the preset filtration value.

9. The non-transitory storage medium according to claim 7, wherein the method further comprises steps before a step of determining the inflection point:

calculating a projection point of each of the border points projected to the benchmark line, and calculating a vertical distance between each of the border points and the determined benchmark line;

selecting a point on the determined benchmark line as a benchmark point;

calculating a vertical distance between each of the calculated projection points and the benchmark point, a value of the vertical distance between each of the calculated projection points and the benchmark point being positive or negative; and arranging the calculated projection points in an order according a size of each calculated distance.

10. The non-transitory storage medium according to claim 9, wherein inflection point conforms according to that: the distance between the projection point of the inflection point and the determined benchmark line is not the maximum and the minimum;

if the vertical distance between a start point of the point cloud and the determined benchmark line is positive, the vertical distance between the inflection point and the determined benchmark line is negative, or if the vertical distance between the start point and the determined benchmark line is negative, the vertical distance between the inflection point and the determined benchmark line is positive; and the inflection point has the maximum vertical distance between the inflection point and the determined benchmark line among the border points located at a same side with the inflection point of the determined benchmark line.

11. The non-transitory storage medium according to claim 8, wherein the benchmark line is determined from the two fitted straight lines by:

calculating a first vertical distance and a second vertical distance between each of the border points in both of the two sub-point clouds and the two fitted straight lines;

determining two maximum vertical distances to the two fitted straight lines correspondingly from the calculated first vertical distances and the second vertical distances;

selecting a smaller one of the two maximum vertical distances, and determining the straight line corresponding to the selected maximum vertical distance as the benchmark line.

12. The non-transitory storage medium according to claim 7, further comprising:

refitting the remainder point cloud using the measurement program.

13. A computing device, comprising:
a storage system;
at least one processor; and
one or more programs that are stored in the storage system and executed by the at least one processor, the one or more programs comprising:

a calculation module that determines a straight line fitted by the point cloud as a benchmark line, the point cloud comprising border points of a workpiece;

a confirmation module that determines an inflection point in the point cloud that is used to fit the determined benchmark line;

a determination module that determines whether a vertical distance between the determined inflection point and the determined benchmark line is greater than a preset filtration value;

a filtration module that deletes needless border points in the point cloud, and obtaining a remainder point cloud that does not include the needless border points in the point cloud, if the vertical distance between the determined inflection point and the determined benchmark line is less than or equal to the preset filtration value, a distance between the needless border point and the determined benchmark line being greater than a predetermined distance value;

a division module that divides the point cloud into two sub-point clouds using the determined inflection point, if the vertical distance between the determined inflection point and the determined benchmark line is greater than the preset filtration value; and a filtration module that deletes one sub-point cloud having a number of the border points less than a preset number, and setting the other sub-point cloud having the number of the border points greater than or equal to the preset number as a remainder point cloud.

14. The computing device according to claim 13, wherein the one or more programs further comprises a command module that fits the two sub-point clouds to be two straight lines using a measurement program in the computing device, if numbers of the border points in the two sub-point cloud are both greater than or equal to the preset number, and the confirmation module further determines one of the two fitted straight lines as the benchmark line, determining the inflection point in the sub-point cloud which is used to fit the determined benchmark line.

15. The computing device according to claim 13, wherein the calculation module further calculates a projection point of each of the border points projected to the benchmark line, calculates a vertical distance between each of the border points and the determined benchmark line, and the confirmation module further selects a point on the determined benchmark line as a benchmark point, calculates a vertical distance between each of the calculated projection points and the benchmark point, calculates a value of the vertical distance between each of the calculated projection points and the benchmark point being positive or negative; and arranges the calculated projection points in an order according a size of each calculated distance.

16. The computing device according to claim 15, wherein the inflection point conforms according to that: the distance between the projection point of the inflection point and the determined benchmark line is not the maximum and the minimum;

if the vertical distance between a start point of the point cloud and the determined benchmark line is positive, the vertical distance between the inflection point and the determined benchmark line is negative, or if the vertical distance between the start point and the determined benchmark line is negative, the vertical distance between the inflection point and the determined benchmark line is positive; and the inflection point has the maximum vertical distance between the inflection point and the determined benchmark line among the border points located at a same side with the inflection point of the determined benchmark line.

17. The computing device according to claim 14, wherein the benchmark line is determined from the two fitted straight lines by:
- calculating a first vertical distance and a second vertical distance between each of the border points in both of the two sub-point clouds and the two fitted straight lines;
- determining two maximum vertical distances to the two fitted straight lines correspondingly from the calculated first vertical distances and the second vertical distances;
- selecting a smaller one of the two maximum vertical distances, and determining the straight line corresponding to the selected maximum vertical distance as the benchmark line.

18. The computing device according to claim 13, wherein the command module further refits the remainder point cloud using the measurement program.

\* \* \* \* \*